Oct. 23, 1951  P. K. CHATTERJEA ET AL  2,572,010
PULSE ECHO OBJECT LOCATOR
Filed June 28, 1946
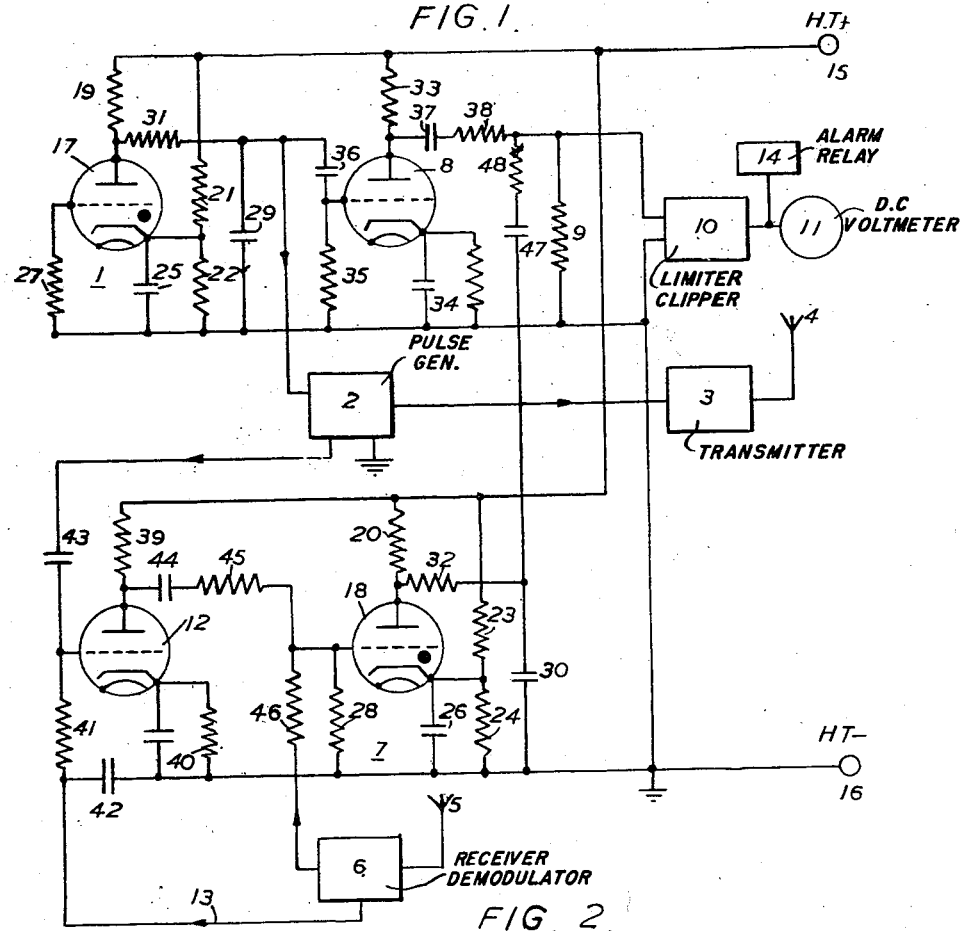
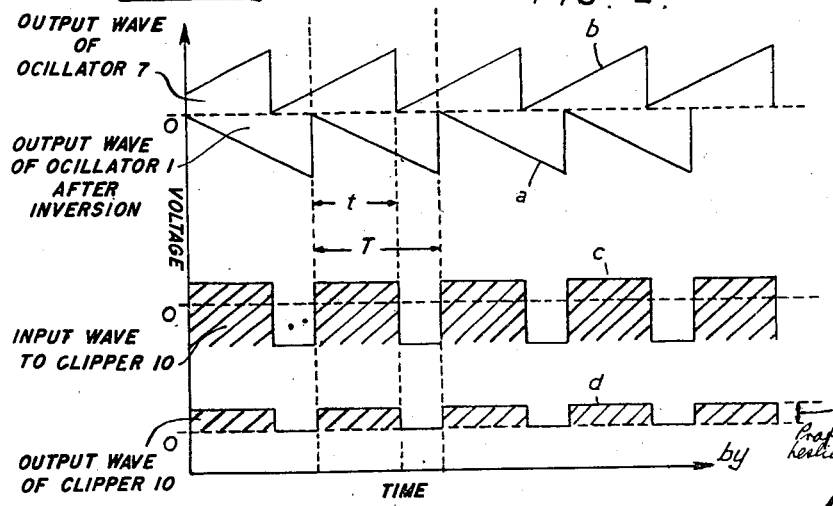
Inventor
Prafulla Kumar Chatterjea
Leslie Wilfred Houghton
by
R P Morris
Attorney Patented Oct. 23, 1951

2,572,010

UNITED STATES PATENT OFFICE 2,572,010

PULSE ECHO OBJECT LOCATOR

Prafulla Kumar Chatterjea and Leslie Wilfred Houghton, London, England, assignors, by mesne assignments, to International Standard Electric Corporation, New York, N. Y., a corporation of Delaware Application June 28, 1946, Serial No. 680,001
In Great Britain June 8, 1945

Section 1, Public Law 690, August 8, 1946
Patent expires June 8, 1965

9 Claims. (Cl. 343—13)

The present invention relates to methods of locating obstacles, such as aircraft, by means of reflected electromagnetic waves.

In Fig. 5 of the specification of the co-pending application Serial No. 468,570, filed December 10, 1942, now United States Patent No. 2,454,772, issued November 30, 1948, there is illustrated an arrangement for measuring the distance of objects in which the reflected pulses are combined with the inverted original pulses in order to obtain unidirectional rectangular pulses whose duration is proportional to the distance of the object. The rectangular pulses are integrated by means of a direct current instrument which then indicates the distance of the object.

The purpose of the present invention is to provide a convenient stabilising circuit for the arrangement by means of which the indicating instrument is caused to give a steady zero reading until an object comes within the range of the locating arrangement, when it suddenly operates to indicate the distance, and its reading follows the object while it remains within range.

The invention provides an arrangement for locating obstacles comprising means including a saw-tooth relaxation oscillator for generating an original train of regularly repeated electric pulses, means for radiating the said pulses, means for receiving the pulses after reflection from an obstacle, means for applying the received pulses to synchronise a second saw-tooth relaxation oscillator, means for deriving jointly from the said oscillators a train of unidirectional pulses having a characteristic depending upon the distance of the obstacle, means for indicating the said characteristic, and means for applying the original train of pulses to synchronise the second oscillator in the absence of any reflected pulses.

The invention will be described with reference to the accompanying drawing in which:

Fig. 1 shows a schematic circuit diagram of an obstacle locating arrangement according to the invention; and Fig. 2 shows diagrams used in explaining the action of Fig. 1.

Referring to Fig. 1, a freely running saw-tooth relaxation oscillator represented generally by the numeral 1 generates waves having a period T, which are applied to synchronise a pulse generator 2 of conventional type which delivers short pulses at equal intervals T to the radio transmitter 3 and transmitting aerial 4. The pulses reflected from the object are picked up on the receiving aerial 5 and are demodulated in the receiver 6 and applied to synchronise a second saw-tooth relaxation oscillator represented generally by the numeral 7, which is similar to 1, and should be adjusted to generate waves of period slightly greater than T when running freely. An amplifying valve 8 is provided to invert the saw-tooth waves generated by 1. The output waves from the oscillator 7 and from the valve 8 are then mixed in a common load resistance 9.

Referring now to Fig. 2, a curve $a$ shows the wave voltage generated by the oscillator 1 after inversion in the valve 8, plotted against time. The waves at the output of the oscillator 7 shown at $b$, Fig. 2, are synchronsed by the reflected pulses obtained from the receiver 6, and will be displaced with respect to the waves $a$ by the time interval $t$ between the original and reflected pulses, where $t$ is the time taken for the pulses to travel from the aerial 4 to the obstacle and back to the receiving aerial 5. After the waves $a$ and $b$ have been mixed together in the load resistance 9 they will appear in the form of rectangular pulses of duration $t$ as shown shaded at $c$ in Fig. 2. These rectangular pulses are then applied to a device 10 (Fig. 1) which converts them into unidirectional pulses $d$ (Fig. 2) having duration $t$ and repeated at intervals equal to T. The device 10 may for example be any suitable limiting device which cuts off the lower portions of the waves $c$.

The unidirectional pulses $d$ are applied to an ordinary direct current voltmeter 11. The reading of the voltmeter will evidently be equal to $t.V/T$, where V is the voltage corresponding to the height of the unidirectional pulses $d$, as shown in Fig. 2. Thus since T is known, the voltmeter reading gives $t$, and hence the distance of the object.

The inverting valve 8 could alternatively have been connected to invert the output of the oscillator 7 instead of that of oscillator 1. The resulting unidirectional pulses $d$ would be of opposite sign, but the operation would be otherwise the same.

The meter 11 may clearly be calibrated in terms of the distance of the obstacle, and this calibration will be independent of the amplitude of the reflected pulses. In case the amplitude of the saw-tooth waves should not be maintained sufficiently constant, the calibration would be affected, but this can be overcome by the device 10 which can be arranged in well known fashion as an amplitude limiter so that the unidirectional pulses $d$ are of fixed amplitude. The measurement then depends only on the duration of the $d$ pulses which in turn depends on the timing of the fly-back strokes of the saw-tooth waves, and not on their amplitude.

In order to keep the system stable when no reflected pulses are being received, synchronising pulses are supplied from the pulse generator 2 (Fig. 1) to the oscillator 7 through a synchronising amplifying valve 12. This will have the effect of bringing the waves $a$ and $b$ (Fig. 2) into the same phase so that $t=0$. There are then no pulses $d$ and the instrument 11 reads zero. The valve 12 is controlled by a bias voltage derived from the receiver 6 over the conductor 13. As soon as any reflected pulses are received, a bias voltage sufficient to cut off the valve 12 is developed in the receiver 6 by an arrangement of known type (not shown) such as that commonly used for generating an automatic gain control voltage for an amplifier. In this way the local synchronising control is removed, and the reflected pulses take over the synchronising of the oscillator 7 in the manner already explained. This means that a value of $t$ slightly less than $T$ will be obtained as soon as the object comes within range, and the instrument 11 will suddenly give practically its maximum reading. As the object moves about, so the instrument will continuously indicate the distance according to the value of $t$. It will be evident that, if desired, a relay 14 could be connected in parallel with the voltmeter 11 to the output of the device 10 having contacts (not shown) for operating an alarm for the purpose of calling the attention of an operator as soon as an object comes within range.

The details of the circuit of Fig. 1 will now be described. A high tension source for the valves is intended to be connected to the terminals 15 (positive) and 16 (negative and earthed).

The two oscillator circuits 1 and 7 are exactly similar and will be described together. They consist of grid-controlled gas-filled valves (17 and 18), the anodes of which are supplied with current from the terminal 15 through resistances (19 and 20). Suitable bias for the cathodes is supplied by pairs of resistances (21, 22 and 23, 24) connected to the high tension terminals 15 and 16, the cathodes being connected to the junction points of the respective pairs of resistances. Condensers 25 and 26 are the cathode by-pass condensers. The control grids are earthed through the usual resistances 27 and 28.

The saw-tooth waves are generated in the oscillators 1 and 7 by the periodic charging of condensers 29 and 30, through resistances 19 and 20, and their periodic discharging through the valves 17 and 18 in the well known manner. Resistances 31 and 32 are provided for limiting the discharge currents in order to prevent damage to the valves.

The anode of the inverting valve 8 is supplied with current from terminal 15 through the resistance 33. The cathode is biassed by means of a conventional condenser-resistance network 34, and 35 is the usual grid resistance. The voltage variations of the condenser 29 are communicated to the control grid through the blocking condenser 36. The inverted saw-tooth waves are supplied to the load resistance 9 from the anode of the valve 8 through the blocking condenser 37 and stopping resistance 38.

The synchronizing valve 12 has elements 39 and 40 corresponding to the elements 33 and 34 of the valve 8. The grid resistance 41 is, however, connected to the source of the cut-off bias in the receiver 6 over conductor 13, instead of to earth. A corresponding by-pass condenser 42 is provided.

The local synchronising pulses for the pulse generator 2 are applied to the control grid of the valve 12 through a blocking condenser 43, and the output pulses are applied to the control grid of the oscillator valve 18 through a blocking condenser 44 and stopping resistance 45. The reflected pulses from the receiver 6 are also applied to this control grid over the stopping resistance 46. Finally, the voltage variations of the condenser 30 are applied to the load resistance 9 through the blocking condenser 47 and stopping resistance 48 to be mixed with the inverted waves from the valve 8.

It has already been stated that the waves from the oscillator 7 could have been inverted instead of those from the oscillator 1. In this case all that is necessary is to interchange the connections of the condensers 36 and 47 to the condensers 29 and 30.

It will be evident that the local synchronising pulses obtained from the generator 2 and supplied to the valve 12 should be in negative sense in order that after inversion thereby they may be in the desired positive sense for synchronising the valve 18. This may be arranged in any suitable way such as by deriving them from a stage of the generator 2 where the pulses are negative, or by supplying an additional inverting valve (not shown). The reflected synchronising pulses applied over resistance 46 must, of course, likewise be arranged to be in positive sense.

The load resistance 9 provides the simplest possible mixing device for combining the waves $a$ and $b$ of Fig. 2. Various other arrangements are clearly possible; for example two mixing valves (not shown) sharing a common load resistance could be connected respectively to the output circuit of valves 8 and 18, or alternatively mixing could be done in a multiple grid valve. Such arrangements are well known to those skilled in the art.

What is claimed is:

1. An arrangement for locating obstacles comprising means including a saw-tooth relaxation oscillator for generating an original train of regularly repeated electric pulses, means for radiating the said pulses, means for receiving the pulses after reflection from an obstacle, means for applying the received pulses to synchronise a second saw-tooth relaxation oscillator, means for deriving jointly from the said oscillators a train of unidirectional pulses having a characteristic depending upon the distance of the obstacle including means for differentially combining the saw-tooth wave outputs of said first and second oscillators, means for indicating the said characteristic, and means for applying the original train of pulses to synchronise the second oscillator in the absence of any reflected pulses.

2. An arrangement for locating obstacles comprising means including a saw-tooth relaxation oscillator for generating an original train of regularly repeated electric pulses, means for radiating the said pulses, means for receiving the pulses after reflection from an obstacle, means for applying the received pulses to synchronise a second saw-tooth relaxation oscillator, means for inverting the waves from one of said oscillators, means for combining the saw-tooth waves of said oscillators, means to translate the resultant combination wave in such manner as to obtain unidirectional rectangular pulses of duration proportional to the distance of the obstacle, means for applying the said pulses to an indicating instrument, and means for applying the original train of pulses to synchronise the second oscillator in the absence of any reflected pulses.

3. An arrangement according to claim 2 comprising means controlled by the incoming reflected pulses for preventing the said original train of pulses from synchronising the second oscillator.

4. An arrangement according to claim 3 comprising means for giving an alarm signal when reflected pulses commence to be received by the said arrangement.

5. An arrangement according to claim 1 in which an amplifying valve is provided by means of which the said original train of pulses is applied to synchronise the said second oscillator and in which means is provided for blocking the said amplifying valve as soon as any reflected pulses are received.

6. An arrangement according to claim 5 comprising means for deriving a negative bias voltage from the received reflected pulses and means for applying the said bias voltage to the control grid of the said amplifying valve for cutting off the said valve.

7. An arrangement according to claim 1 in which the said indicating instrument comprises a direct current voltmeter to which the unidirectional pulses are applied.

8. An arrangement according to claim 7 comprising an alarm relay connected in parallel with the said voltmeter.

9. An arrangement for locating obstacles comprising means including a saw-tooth relaxation oscillator for generating an original train of regularly repeated electric pulses, means for radiating said pulses, means for receiving the pulses after reflection from an obstacle, a second saw-tooth relaxation oscillator, means for applying the received pulses to synchronise said second oscillator, means for inverting the waves from one of said oscillators, means for combining the saw-tooth waves of said oscillators, and means to translate the resultant combination wave to obtain unidirectional rectangular pulses of duration proportional to the distance of the obstacle.

PRAFULLA KUMAR CHATTERJEA.
LESLIE WILFRED HOUGHTON.

REFERENCES CITED

The following references are of record in the file of this patent:

UNITED STATES PATENTS

| Number | Name | Date |
| --- | --- | --- |
| 2,250,708 | Hers | July 29, 1941 |
| 2,391,411 | Goble | Dec. 25, 1945 |
| 2,416,333 | Lehmann | Feb. 25, 1947 |
| 2,428,427 | Loughren | Oct. 7, 1947 |
| 2,428,799 | Hayes | Oct. 14, 1947 |